(12) United States Patent
Schneider

(10) Patent No.: US 11,604,309 B2
(45) Date of Patent: Mar. 14, 2023

(54) FIBER OPTIC TINSEL GARLAND HAVING A SPIRAL FIBER OPTIC AND A FIBER OPTIC BUNDLE AT AN END THEREOF

(71) Applicant: Michael Joseph Schneider, Cape Coral, FL (US)

(72) Inventor: Michael Joseph Schneider, Cape Coral, FL (US)

(*) Notice: Subject to any disclaimer, the term of this patent is extended or adjusted under 35 U.S.C. 154(b) by 0 days.

(21) Appl. No.: 17/457,032

(22) Filed: Nov. 30, 2021

(65) Prior Publication Data

US 2022/0171113 A1 Jun. 2, 2022

Related U.S. Application Data

(60) Provisional application No. 63/205,311, filed on Dec. 1, 2020.

(51) Int. Cl.
*F21V 8/00* (2006.01)
*F21S 4/10* (2016.01)
*A47G 33/06* (2006.01)

(52) U.S. Cl.
CPC ............ *G02B 6/0005* (2013.01); *A47G 33/06* (2013.01); *F21S 4/10* (2016.01)

(58) Field of Classification Search
CPC ............... A47G 33/08; A47G 33/0809; A47G 33/0818; A47G 33/0827; A47G 33/0836; A47G 33/0845; A47G 33/0854; A47G 33/0863; A47G 33/0872; A47G 33/0881; A47G 33/0889; A47G 33/06; F21W 2121/04; F21S 4/00; F21S 4/10; F21S 4/15; F21S 4/20; F21S 4/22; F21S 4/24; F21S 4/26; F21S 4/28
See application file for complete search history.

(56) References Cited

U.S. PATENT DOCUMENTS

| | | | |
|---|---|---|---|
| 5,558,422 A | 9/1996 | Sanford | |
| 5,820,248 A * | 10/1998 | Ferguson | F21S 4/10 362/122 |
| 5,865,533 A * | 2/1999 | Liu | G02B 6/0008 362/583 |
| 6,299,339 B1 * | 10/2001 | Chu | F21S 10/005 362/567 |
| 6,739,745 B1 | 5/2004 | Valdes | |
| 7,257,303 B2 | 8/2007 | Walker, Jr. et al. | |
| 7,628,524 B2 | 12/2009 | Lemay et al. | |

* cited by examiner

*Primary Examiner* — Robert J May
(74) *Attorney, Agent, or Firm* — Kim IP Law Group LLC; Jeoyuh Lin

(57) ABSTRACT

An illumination device, including a fiber optic spiral wrapped around an electrical wire, a plug connected to the electrical wire on one end, and a fiber optic bundle connected to the fiber optic spiral and the electrical wire on an other end opposite the one end. The fiber optic bundle includes a bundle chamber attached to the electrical wire and the fiber optic spiral on a first end, and an illumination member at the wide end and attached to the electrical wire; and fiber optic strands extending from a second end opposite the first end.

12 Claims, 4 Drawing Sheets

FIBER OPTIC TINSEL GARLAND HAVING A SPIRAL FIBER OPTIC AND A FIBER OPTIC BUNDLE AT AN END THEREOF

CROSS-REFERENCE TO RELATED APPLICATIONS

This application claims the benefit of U.S. Provisional Application No. 63/205,311 filed on Dec. 1, 2020, the contents of which are hereby incorporated by reference.

TECHNICAL FIELD

The present disclosure relates generally to a lighting device. More specifically, the disclosure is directed to a fiber-optic lighting device.

BACKGROUND

Tinsel garlands are generally used for decoration during the Holidays. The garlands have reflective surfaces that, in daylight, make the tinsel visually sparkling to a viewer, and adds to the festiveness of the decoration during the Holidays.

Attempts have been made to illuminate the tinsel garlands at night. For example, a string of small incandescent light bulbs may be wound around the tinsel garland, so that light from the light bulbs may reflect off of the tinsel garland so that it can be seen at night.

However, the tinsel garland itself does not illuminate any light, but must rely on lights reflected off of its surface. Also, the small light bulbs wound around the tinsel garland have a tendency to burn out quickly. Where simple circuits are used, the burning out of even one light bulb means that the entire illumination goes out, and the entire tinsel garland has to be replaced. It is also tedious to identify the particular burned out light bulb. Therefore, reliability is an issue.

Further, even when parallel circuits are used for the light bulbs so that one burned out light bulb does not affect the entire illumination, the design adds to the complexity of the device, and the use of numerous light bulbs for the tinsel garland to consume large amounts of electricity over time.

Recently, Light Emitting Diodes (LED) have replaced the use of light bulbs, resulting in a prolonged lifespan of the illumination. The same problems can persist when an LED goes out. That is, when one LED burns out, the entire illumination has to be replaced period where simple circuits are used.

Additionally, when multiplicity of LED lights are still used in the illumination the device becomes more complicated and renders the illumination uneven according to the lifetime of each LED, which tends to variably dim at different times. Also, amount of energy consumption by multiple LEDs are still too high.

In view of the above discussion, there is a need for a different type of illumination for the tinsel garland that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include an illumination device, including a fiber optic spiral wrapped around an electrical wire, a plug connected to the electrical wire on one end, and a fiber optic bundle connected to the fiber optic spiral and the electrical wire on an other end opposite the one end. The fiber optic bundle includes a bundle chamber attached to the electrical wire and the fiber optic spiral on a first end, and an illumination member at the wide end and attached to the electrical wire, and fiber optic strands extending from a second end opposite the first end.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
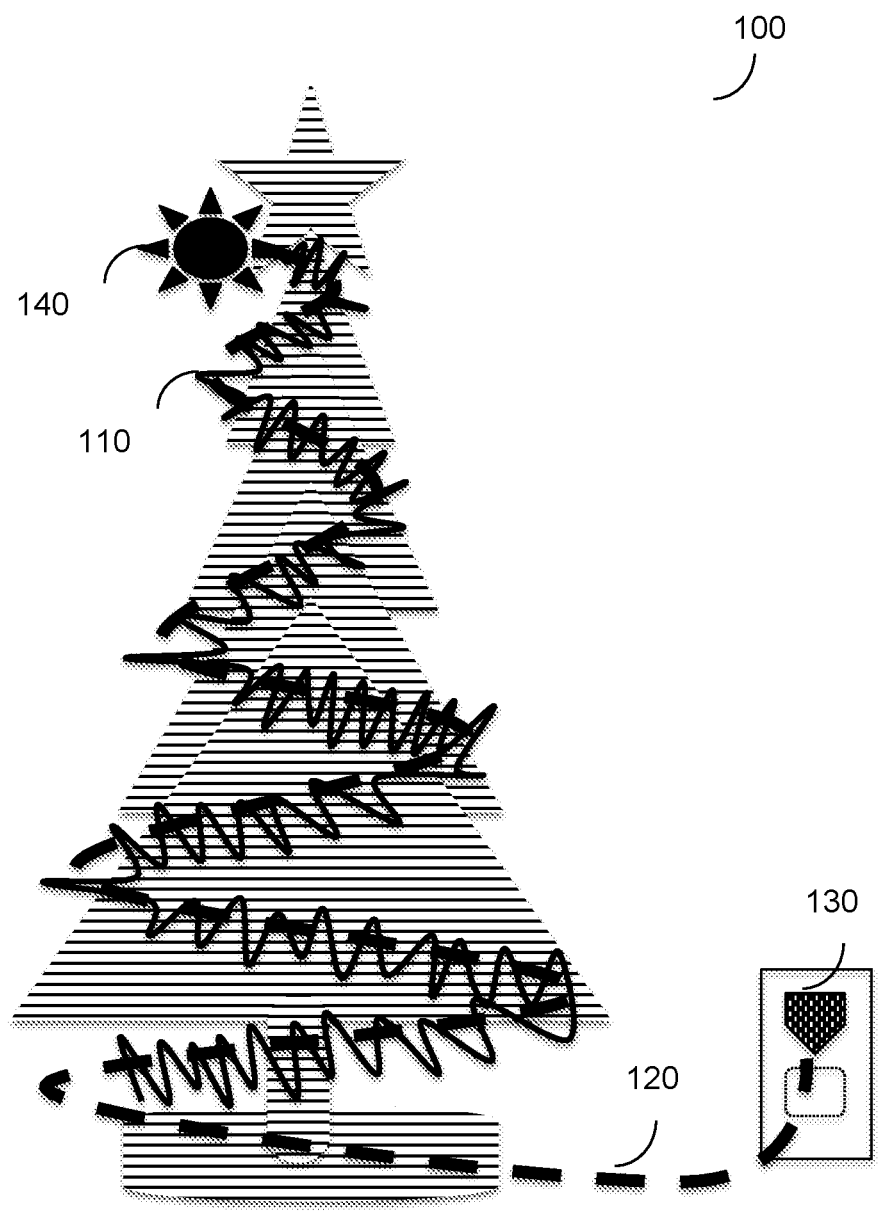
FIG. 1 is a fiber optic tinsel garland 100 according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a fiber optic tinsel garland that adds illumination and decoration to a natural or artificial Christmas tree. This allows the observer the opportunity to appreciate the beauty of a brightly illuminated tree that fiber optic light decorations offer. The fiber optic tinsel garland has an electrical power source connected to it, and includes an electrical wire with a fiber optic strand wound around the electrical and attached to a power source. The fiber optic garland may be around 35 feet in length, and in place of short, side-flaring tinsel strands, and includes flaring fiber strands that illuminate with "moving" light and colors.

The fiber optic tinsel garland may be wrapped or spun around a Christmas tree, hung over doorways or mounted to adorn a drape line along walls or ceilings for bright fiber optic decoration.

FIG. 1 shows a fiber optic tinsel garland 100 (garland) according to an embodiment. The garland 100, which is also an illumination device, includes a fiber optic spiral 110 (spiral), electrical wire 120, a plug 130, and a fiber optic bundle 140 (bundle).

The fiber optic spiral 110 wraps tightly around an electrical wire 120, and is made of plastic or glass fibers. In an embodiment, the fiber optic spiral 110 may illuminate with sequential lighting and may also alternate colors during illumination.

The electrical wire 120 is connected to the plug 130 on one end. In an embodiment, the plug 130 is connected to a power source such as a wall-mounted electrical outlet. Alternatively, the plug 130 may also be connected to a battery.

A fiber optic bundle 140 (bundle) is attached to an end of the electrical wire 120 opposite to the end of the electrical wire 120 where the plug 130 is located.

Further details of the fiber optic bundle 140 will be described in more detail in FIG. 2.

In the embodiment, the garland 100 is wrapped around a Christmas tree. However, this example is not exclusive, as the garland 100 can also be hung on different structures, such as off a ceiling, on a door, or on the side of a building for decorative purposes. Also, the plug 130 does not necessarily have to be on an end of the electrical wire 120 opposite to that of the bundle 140. For example, both the plug 130 and the bundle 140 can be located on the same end of the electrical wire 120. Also, the number of both the plug 130 and the bundle 140 attached to the electrical wire 120 can vary. For example, there may be multiple plugs 130 or bundles 140 located along the electrical wire 120. Here, any of the plugs 130 may be connected to other garlands 100, and additional bundles 140 may run throughout the electrical wire 120 to add additional illumination and attractiveness to the user.

In operation, power from an outlet is delivered from the plug 130 at the electrical outlet through the electrical wire 120 to the bundle 140, where the power is split to illuminate both the bundle 140 and the fiber optic spiral 110.

Figure 2:
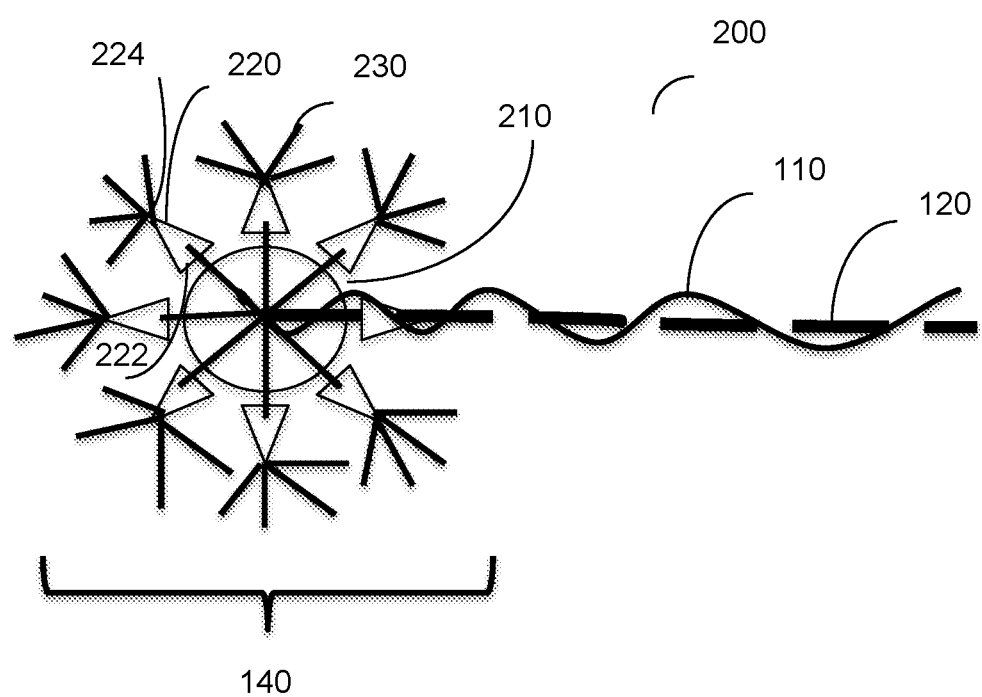
FIG. 2 is a close-up view of a fiber optic bundle, according to an embodiment.

FIG. 2 shows a close-up view 200 of the bundle 140, according to an embodiment. The bundle 140 includes a core 210, bundle chambers 220, and fiber optic strands 230. The core 210 is attached to an end of the electrical wire 120 as shown previously in FIG. 1. The bundle 140 includes a core 210 at the center of the bundle 140. The core 210 includes wire branches 212 that split out from the electrical wire 120 and connect to the bundle chambers 220.

The bundle chambers 220 are connected circumferentially surrounding the core 210, at a wide end 222 of each of the bundle chambers 220. In the embodiment, the bundle chambers 220 may have a conical, tapered shape, each have a narrow end 224 opposite the wide end 222. Here, the fiber optic strands 230 extend from the narrow ends 222 of the bundle chambers 220. The bundle chambers 220 each include a light source (not shown), the details of which will be described in more detail in FIG. 3.

The fiber optic strands 230 may be made of plastic or glass fibers that gather around the narrow end 224 of the bundle chambers 220. In the embodiment, the number of fiber optic strands 230 within each bundle chamber 220 can vary in order to achieve the desired lighting effect and optimize illumination of the garland. Also, the fiber optic strands 230 may have similar diameters, and may be made of similar materials as that of the spiral 110. However, in another embodiment, the diameter and materials may vary between the fiber optic strands 230 and the spiral 110.

Figure 3:
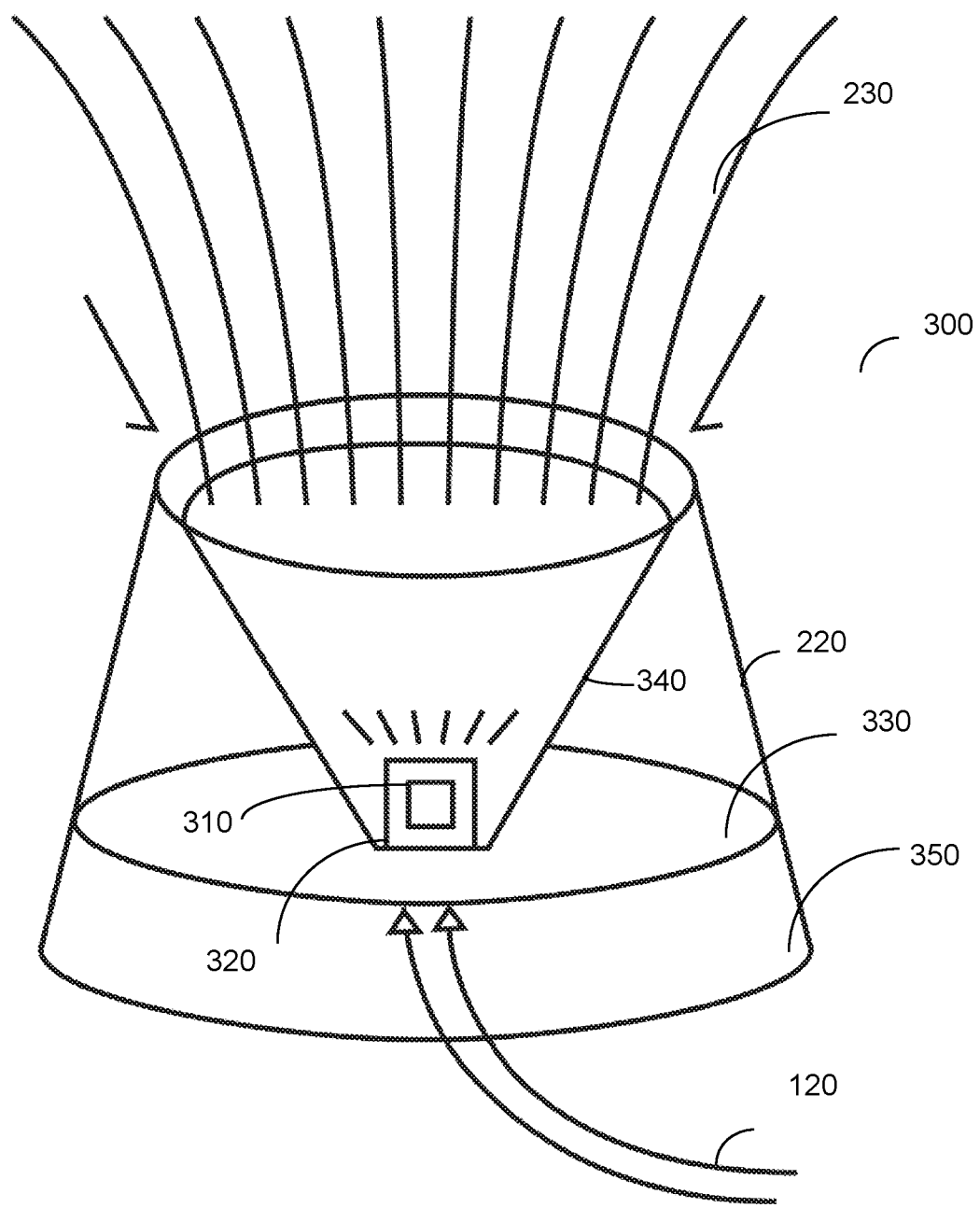
FIG. 3 is a detailed diagram of a conical fiber optic bundle chamber, according to an embodiment.

FIG. 3 is a detailed diagram 300 of the bundle chamber 220, according to an embodiment. In the embodiment, the bundle chamber 220 includes an LED 310, a substrate 320, a platform 330, a reflector rim 340, and a conical conduction chamber 350.

The LED 310 is a lighting component that is seated above the substrate 320. Both the LED 310 and the substrate 320 may be located on a platform 330. In this embodiment, the bundle chamber 220 has circular conical shape, with a wider end having a maximum diameter of about 8 mm or less and an inner diameter of about 6 mm or less facing the LED 310 to direct light from the LED 310 to funnel through the bundle chamber 220. The bundle chamber 220 also has a narrower end opposite the wider end, where the fiber-optic strands 230 extends from the narrower end. The bundle chamber 220 may also be about 8 mm or less in height. The height profile has been found to be optimal in reducing the bundle chamber's 220 visibility. Also, the dimensions given above allows for an observer's visual focus on the fiber optic bundle strands 230.

That is, in the embodiment, the size of the bundle chambers 220 may be small relative to fiber optic strands 230, so that the fiber optic bundle can have a more tinsel-like appearance. Also, in the embodiment, the LED 310 fits snuggly just above the reflector rim 340 at a lower center portion of the reflector rim 340, which may be conical in shape in an inverse configuration to the bundle chamber 220. Beneath the LED 310 and the platform 330, the conical conduction housing 350 houses the electrical wiring (not shown). The electrical wiring housed in the conical conduction housing 350 allows the LED 310 to receive power via the electrical wire 120. The conical conduction housing 350 is non-transparent, and allows no light penetration from the light emanating from the LED 310. This way, light from the LED is focused in a vertical direction towards the fiber-optic strands, along with the upward-focused reflection allowed by the mirrored reflector rim 340. The electrical wire 120 carries the electrical power current to the LED 310 via these connections.

In another embodiment, the garland 100 as a unit would include many of these small bundle chambers 220 along with the accompanying fiber-optic strands 230 ordered very closely in a spiral order encircling the electrical wire 120 along the length of the garland 100.

In an embodiment, to simplify the structure, the inside of the bundle chamber 220 may be hollow without the reflector rim 340 for the light emitted from the LED 310 to directly pass through to the fiber-optic strands 230. Here the interior of the bundle chamber 220 may itself be reflective to amplify and direct the light emitted from the LED 310 toward the fiber-optic strands 230.

In another embodiment, the entire bundle chamber 220 may be constructed of solid to translucent plastic (i.e., have a translucent core) that encapsulates the LED 310 and restricts light penetration and exit. Here, light is permitted to exit through the opening at the open top area of the bundle chamber 220 to illuminate the small bundle of tightly packed fiber optic strands 230.

Additionally, a small laser lighting including laser diodes may serve as a light source in place of the LED 310 to illuminate the fiber-optic strands 230. Also, the fiber optics strands 230 include short length fiber optic fibers of about under 4 inches in length, which is preferable for maximum light transfer through the fibers to achieve maximum illumination, while simultaneously achieving minimum light wattage needed to illuminate the fiber optics strands 230 to a certain lumen level from the LED 310. The fiber optics strands 230 also include fine individual optic fibers that emit light from both the ends and the sides of each fiber. To offer maximum illumination and brightness from all sides the fiber optics strands 230 are clustered together.

Figure 4:
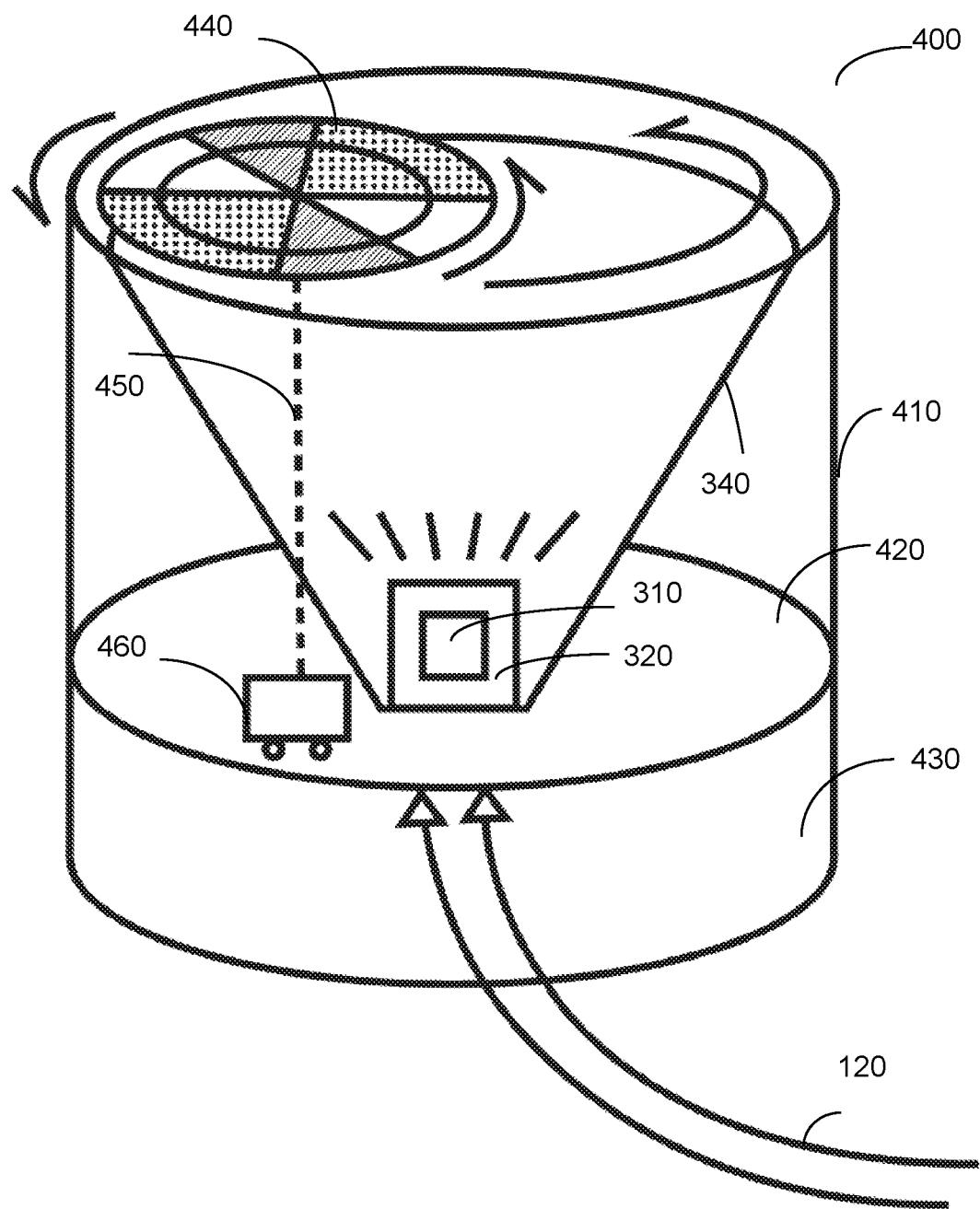
FIG. 4 is a detailed diagram of a cylindrical fiber optic bundle chamber with moving colors, according to an embodiment.

FIG. 4 is a detailed diagram 400 of a cylindrical fiber optic bundle chamber 410 with moving colors, according to an embodiment. The cylindrical fiber optic bundle chamber 410 includes the LED 310, the substrate 320, a cylindrical platform 420, a cylindrical conduction housing 430, color pattern disc 440, axle 450, and an electric motor 460. Here, description of components similar to the elements described in FIG. 3, including the LED 310, the substrate 320, electrical wire 120, etc., will not be repeated here, and the description regarding FIG. 4 will focus on features that are different or modified from that described in FIG. 3.

The cylindrical fiber optic bundle chamber 410, which may be constructed of plastic, has an outer diameter of about 8 mm or less, an inner diameter of about 6 mm or less, and a height of about 8 mm or less. The height profile has been found to be optimal in reducing the cylindrical fiber optic bundle chamber's 410 visibility. Also, the dimensions given above allows for an observer's visual focus on the fiber optic bundle strands 230.

That is, in the embodiment, the size of the bundle chambers 410 may be small relative to fiber optic strands 230, so that the fiber optic bundle can have a more tinsel-like appearance.

The color pattern disc 440 may be a semi-transparent/translucent plastic disc that is located above the cylindrical fiber optic bundle chamber 410, with varied color patterns. In an embodiment, the color pattern disk 440 may be configured to turn and rotate around its central axis so that the light coming from the LED 310 maybe filtered into different colors as it passes through the color pattern disk 440 to the fiber optic strands 230.

The axle 450 is substantially vertically connected to the color pattern disc for 440 on one end. On another opposite end the axle 450 is connected to the electric motor 460. The electric motor 460, which is connected to and powered by the electrical wire 120, turns the color pattern disc 450 in a circular manner.

In operation, light coming from the LED 310, which may be directed vertically by the reflector rim 340 away from the LED 310, passes through the rotating color pattern disc 440 to the fiber optic strands 230. This creates a "moving colors" effect, where the lights emitted from the LED 310 changes colors when emanating from the fiber optic strands 230. In an embodiment, while the color pattern disc 440 rotates around its center axis, it can also be configured to move along the outer rim of the upper part of the cylindrical fiber optic bundle chamber 410. For example, the electric motor 460 may move above the platform 420 around the outer periphery of the inside of the cylindrical fiber optic bundle chamber 410, bringing along with the axle 450 and the color pattern disc 440 with it. This way, the color pattern disc 440 also moves around the upper outer periphery of the cylindrical fiber optic bundle chamber 410.

With the garland 100 described above from FIG. 1-4, since LEDs 310 are used, energy consumption is greatly decreased. Also, the use fiber optic strands 230 greatly enhances the brightness of the garland 100 at night. Also, since only one LED 310 is used per optic bundle chamber 220/410, when one LED 310 is used up, one may quickly locate the location where the lighting has decreased, and quickly replace the LED 310. Additionally, the movement and diverse color change from white light of the LED into beautiful, brilliant multicolored light pattern, and makes the light emanating from the garland 100 far more entertaining to the observer.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. An illumination device, comprising:
a fiber optic spiral wrapped around an electrical wire;
a plug connected to the electrical wire on one end; and
a fiber optic bundle connected to the fiber optic spiral and the electrical wire on another end opposite the one end, the fiber optic bundle comprising:
a bundle chamber having a first end and a second end opposite the first end, the electrical wire and the fiber optic spiral operatively connected to the first end of the bundle chamber,
an illumination member at the first end of the bundle chamber and operatively connected to the electrical wire, and
fiber optic strands extending from the second end of the bundle chamber.

2. The illumination device of claim 1, wherein the fiber optic spiral is configured to be operatively connected to a structure, the structure including one of a tree, doorway, a wall, or a ceiling.

3. The illumination device of claim 1, wherein the fiber optic spiral is configured to illuminate with sequential lighting.

4. The illumination device of claim 1, wherein the fiber optic spiral is configured to illuminate with alternating colors based on a pattern.

5. The illumination device of claim 1, wherein the bundle chamber is translucent.

6. The illumination device of claim 1, wherein the bundle chamber is conical.

7. The illumination device of claim 1, wherein the bundle chamber is cylindrical.

8. The illumination device of claim 1, wherein the bundle chamber is shaped to accept the fiber optic strands on the second end.

9. The illumination device of claim 1, wherein the bundle chamber further comprises a reflector rim.

10. The illumination device of claim 1, wherein the bundle chamber further comprises:
- a color pattern disc;
- an axis connected to the color pattern disc on a first end of the axis; and
- an electric motor connected to the second end of the axis opposite the first end of the axis.

11. The illumination device of claim 10, wherein the electric motor is configured to rotate the color pattern disc via the axle.

12. The illumination device of claim 10, wherein the color pattern disc is configured to move around a periphery of the bundle chamber.

\* \* \* \* \*